US012034248B2

(12) United States Patent
Huang et al.

(10) Patent No.: US 12,034,248 B2
(45) **Date of Patent: *Jul. 9, 2024**

(54) WIRE END CONNECTOR AND CONNECTOR ASSEMBLY

(71) Applicant: Dongguan Luxshare Technologies Co., Ltd, Dongguan (CN)

(72) Inventors: Bin Huang, Dongguan (CN); HongJi Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,877

(22) Filed: May 18, 2023

(65) Prior Publication Data

US 2023/0291146 A1 Sep. 14, 2023

Related U.S. Application Data

(63) Continuation of application No. 17/379,606, filed on Jul. 19, 2021, now Pat. No. 11,695,235.

(30) Foreign Application Priority Data

Dec. 16, 2020 (CN) ......................... 202011489363.8

(51) Int. Cl.
*H01R 13/629* (2006.01)
*H01R 12/78* (2011.01)
*H01R 13/639* (2006.01)

(52) U.S. Cl.
CPC ........... *H01R 13/629* (2013.01); *H01R 12/78* (2013.01); *H01R 13/639* (2013.01)

(58) Field of Classification Search
CPC ..... H01R 13/629; H01R 13/639; H01R 12/78
See application file for complete search history.

(56) References Cited

U.S. PATENT DOCUMENTS

| | | | | |
|---|---|---|---|---|
| 6,447,170 | B1 * | 9/2002 | Takahashi ............ | G02B 6/3893 439/352 |
| 6,851,867 | B2 | 2/2005 | Pang et al. | |
| 7,040,911 | B1 * | 5/2006 | Ho ....................... | G02B 6/4292 439/352 |
| 7,090,523 | B2 | 8/2006 | Shirk et al. | |
| 7,108,523 | B2 | 9/2006 | Hartman | |
| 7,429,185 | B1 | 9/2008 | Wu | |

(Continued)

OTHER PUBLICATIONS

US OA dated Mar. 28, 2023 in U.S. Appl. No. 18/073,023.

*Primary Examiner* — Neil Abrams
(74) *Attorney, Agent, or Firm* — Birch, Stewart, Kolasch & Birch, LLP

(57) ABSTRACT

A wire end connector and a connector assembly are provided. The wire end connector comprises a wire end housing and an unlocking member. The wire end housing comprises a wire end accommodating part and a retaining notch. The unlocking member comprises two opposite unlocking arms an activation piece and a buckling connecting piece. The two unlocking arms being movably disposed in the wire end housing, one end of the buckling connecting piece is connected to the two unlocking arms and disposed in the retaining notch, another end of the buckling connecting piece is connected to the activation piece.

20 Claims, 11 Drawing Sheets

(56) References Cited

U.S. PATENT DOCUMENTS

| | | | |
|---|---|---|---|
| 8,113,723 | B2 | 2/2012 | Togami et al. |
| 8,348,701 | B1 | 1/2013 | Lan et al. |
| 8,506,172 | B2 | 8/2013 | Meadowcroft et al. |
| 8,546,252 | B2 | 10/2013 | Wang et al. |
| 8,790,022 | B2 | 7/2014 | Yi |
| 9,001,515 | B2 | 4/2015 | Tang et al. |
| 9,118,149 | B2 | 8/2015 | Kappla et al. |
| 9,250,402 | B2 | 2/2016 | Ishii et al. |
| 9,306,303 | B2 | 4/2016 | Chen et al. |
| 9,348,101 | B2 | 5/2016 | Wang et al. |
| 9,385,466 | B2 | 7/2016 | Henry et al. |
| 9,411,111 | B2 | 8/2016 | Banal, Jr. et al. |
| 9,774,113 | B2 | 9/2017 | Zhang et al. |
| 9,801,301 | B1 | 10/2017 | Costello |
| 9,829,662 | B2 | 11/2017 | Kurashima |
| 9,929,500 | B1 | 3/2018 | Ista |
| 10,236,605 | B1 | 3/2019 | Henry et al. |
| 10,454,194 | B1 | 10/2019 | Phillips et al. |
| 10,606,001 | B1 | 3/2020 | Ko |
| 10,855,028 | B1 | 12/2020 | Henry et al. |
| 10,916,887 | B2 * | 2/2021 | Chan .................... H01R 13/512 |
| 11,171,445 | B1 | 11/2021 | Shen et al. |
| 11,189,971 | B2 | 11/2021 | Lu |
| 11,196,213 | B2 | 12/2021 | Shen et al. |
| 11,228,140 | B2 | 1/2022 | Hsiao et al. |
| 11,303,065 | B2 | 4/2022 | Wang et al. |
| 11,695,235 | B2 * | 7/2023 | Huang ............... H01R 13/6275 439/328 |
| 2006/0078259 | A1 | 4/2006 | Fuchs |
| 2006/0160429 | A1 | 6/2006 | Dawiedczyk et al. |
| 2010/0062650 | A1 | 3/2010 | Nakamura |
| 2013/0040482 | A1 | 2/2013 | Ngo et al. |
| 2013/0040485 | A1 | 2/2013 | Ngo |
| 2014/0193993 | A1 | 7/2014 | Meng et al. |
| 2015/0044913 | A1 | 2/2015 | Chen |
| 2015/0255922 | A1 | 9/2015 | Kawamura et al. |
| 2017/0194741 | A1 | 7/2017 | Zhang et al. |
| 2018/0034211 | A1 | 2/2018 | Little et al. |
| 2018/0040977 | A1 | 2/2018 | Zhao et al. |
| 2019/0173232 | A1 | 6/2019 | Lu et al. |
| 2019/0372251 | A1 | 12/2019 | Huang et al. |
| 2019/0372256 | A1 | 12/2019 | Phillips et al. |
| 2020/0244025 | A1 | 7/2020 | Winey et al. |
| 2020/0259294 | A1 | 8/2020 | Lu |
| 2020/0321727 | A1 | 10/2020 | Li et al. |
| 2020/0335914 | A1 | 10/2020 | Hsu et al. |
| 2020/0358224 | A1 | 11/2020 | Chan |
| 2020/0366016 | A1 | 11/2020 | Hsiao et al. |
| 2021/0013649 | A1 | 1/2021 | Costello et al. |
| 2021/0098913 | A1 | 4/2021 | Hsu et al. |
| 2021/0166834 | A1 | 6/2021 | Tanaka et al. |
| 2021/0167535 | A1 | 8/2021 | Tanaka et al. |
| 2021/0305732 | A1 | 9/2021 | Chen |
| 2021/0336386 | A1 | 10/2021 | Wu et al. |
| 2021/0361531 | A1 | 11/2021 | Chen |
| 2022/0045459 | A1 | 2/2022 | Lin et al. |
| 2022/0052487 | A1 | 2/2022 | Chang |
| 2022/0059958 | A1 | 2/2022 | Hsu et al. |
| 2022/0109260 | A1 | 4/2022 | Sato |
| 2022/0190511 | A1 | 6/2022 | Huang et al. |
| 2022/0190513 | A1 | 6/2022 | Henry et al. |
| 2022/0190522 | A1 | 6/2022 | Huang et al. |
| 2022/0231464 | A1 | 7/2022 | Chen et al. |
| 2022/0200190 | A1 | 8/2022 | Song et al. |

* cited by examiner

WIRE END CONNECTOR AND CONNECTOR ASSEMBLY

CROSS-REFERENCE TO RELATED APPLICATION

This application is a Continuation application of U.S. patent application Ser. No. 17/379,606, filed on Jul. 19, 2021, which claims the priority benefit of Chinese Patent Application Serial Number 202011489363.8, filed on Dec. 16, 2020. These and all other referenced extrinsic materials are incorporated herein by reference in their entirety.

BACKGROUND

Technical Field

The present disclosure relates to the technical field of connector, particularly to a wire end connector and a connector assembly.

Related Art

Conventional wire end connectors usually comprise a wire end connector body and a puller unlocking component. When a wire end connector is connected with the board end connector, the wire end connector can be disconnected with the board end connector through a puller unlocking component. Since the puller unlocking component is disposed on the top surface of the wire end connector body and operates along a direction vertical to the wire end connector, the thickness of the wire end connector and the thickness of the board end connector are increased, which is not favorable for the thinning of the connectors. Besides, the configuration of the puller unlocking component is quite complicated, making it difficult for manufacturing.

SUMMARY

The embodiments of the present disclosure provide a wire end connector and a connector assembly tended to solve the problem that the wire end connector cannot be thinned as the puller unlocking component of conventional wire end connectors is disposed on the top surface of the wire end connector body.

In one embodiment of the present disclosure, a wire end connector is provided, comprising a wire end housing, and an unlocking member. The wire end housing comprises a wire end accommodating part and a retaining notch. The wire end accommodating part accommodates a wire end connector body of the wire end connector. The unlocking member is disposed at one side of the wire end housing that comprising the retaining notch. The unlocking member comprises two opposite unlocking arms, an activation piece and a buckling connecting piece. The two unlocking arms are movably disposed in the wire end housing. One end of the buckling connecting piece is connected to the two unlocking arms and disposed in the retaining notch, another end of the buckling connecting piece is connected to the activation piece.

In another embodiment, a connector assembly is provided, comprising a wire end connector according the above embodiment and a board end connector. The board end connector comprises a board end connector body and a board end housing accommodating the board end connector body. The board end housing comprises two buckling slots. An outer surface of the two buckling slots and away from the board end connector body respectively comprises a board end buckling part. Wherein when the unlocking member moves in a direction away from the board end connector, the two opposite unlocking arms would pass through the wire end housing and pushes the board end buckling part.

In the embodiments of the present disclosure, since the two unlocking arms of the unlocking member are disposed in wire end housing, the two unlocking arms could be moving in a horizontal direction. Thus, the thickness of the wire end connector in the vertical direction would not be increased, allowing the thickness of the wire end connector to be thinned.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

Figure 1:
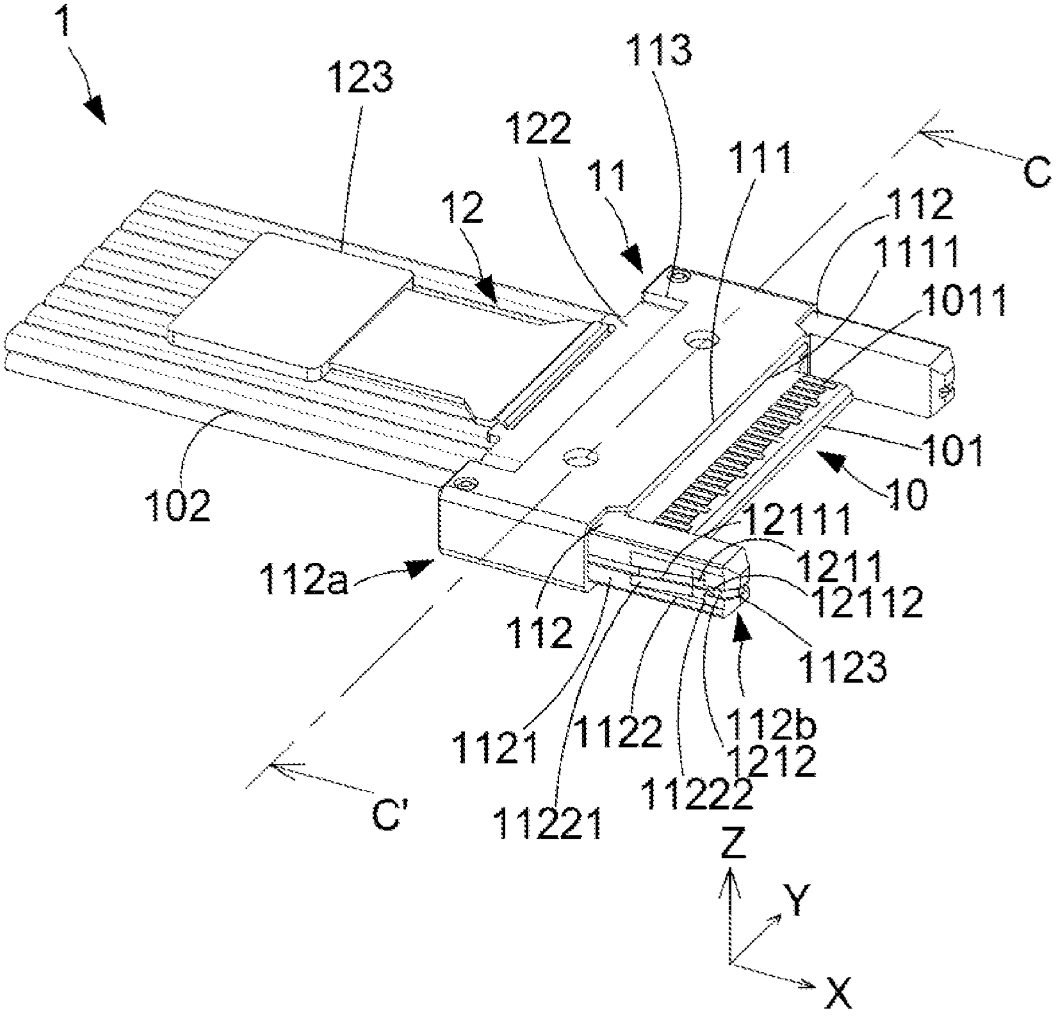
FIG. 1 is a perspective view of a wire end connector of an embodiment of the present disclosure.
Figure 2:
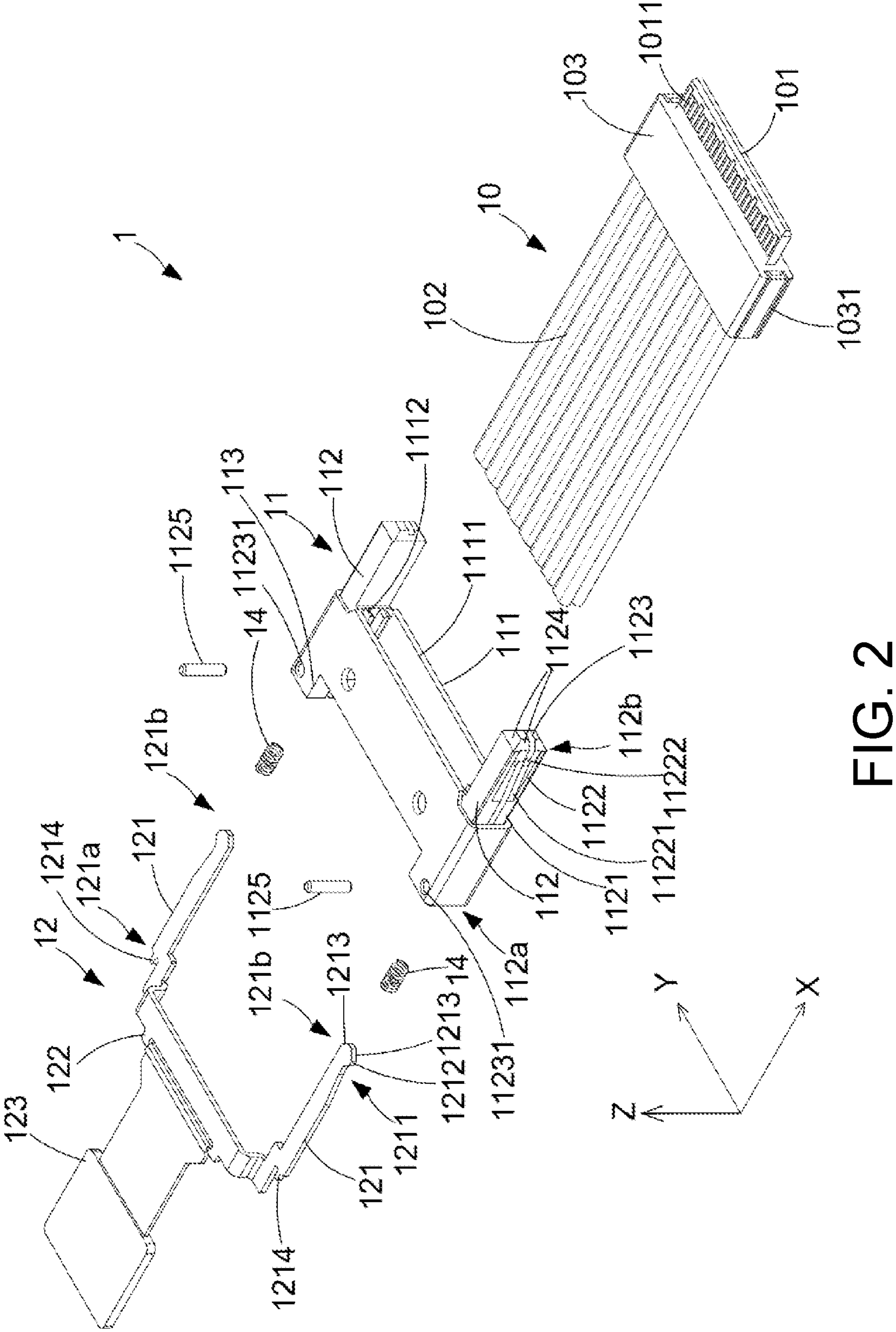
FIG. 2 is an exploded view of a wire end connector of an embodiment of the present disclosure.

FIG. 1 and FIG. 2 are perspective view and exploded view of a wire end connector of an embodiment of the present disclosure. As shown in the figures, in this embodiment, the wire end connector 1 comprises a wire end connector body 10, a wire end housing 11, and an unlocking member 12. The wire end housing 11 comprises a wire end accommodating part 111 and two buckling bumps 112. An end surface of the wire end accommodating part 111 in the first direction X comprises a wire end opening 1111. The two buckling bumps 112 are oppositely disposed on two sides of the wire end accommodating part 111. The two buckling bumps 112 respectively comprise a first end 112*a* and a second end 112*b*. The first ends 112*a* of the two buckling bumps 112 are close to one side of the wire end housing 11 away from the wire end opening 1111. The second ends 112*b* of the two buckling bumps 112 respectively protrude from one end of the wire end accommodating part 111 comprising the wire end opening 1111 in the first direction X.

An outer surface 1121 of the two buckling bumps 112 in the second direction Y respectively comprise a buckling recess 1122. The buckling recesses 1122 of the two buckling bumps 112 are respectively disposed between the wire end accommodating part 111 and the second ends 112*b* of the two buckling bumps 112. The wire end connector body 10 is disposed in the wire end accommodating part 111 of the wire end housing 11. The unlocking member 12 comprises two opposite unlocking arms 1211 and is disposed at one side of the wire end housing 11 away from the wire end opening 1111. The two unlocking arms 121 are movably disposed in the two buckling bumps 112 respectively. The two unlocking arms 121 respectively comprise a connecting end 121*a* and a buckling end 121*b*. The connecting ends 121*a* of the two unlocking arms 121 are respectively disposed in the first ends 112*a* of the two buckling bumps 112. The buckling ends 121*b* of the two unlocking arms 121 are respectively disposed in the second ends 112*b* of the two buckling bumps 112. The two unlocking arms 121 respectively protrude from one end of the wire end accommodating part 111 comprising the wire end opening 1111 in the first direction X.

The outer side edges of the two unlocking arms 121 in the second direction Y and away from the wire end accommodating part 111 comprise a wire end buckling part 1211 and an unlocking part 1212 respectively. The wire end buckling parts 1211 of the two unlocking arms 121 respectively correspond to the buckling recesses 1122 of the two buckling bumps 112. The unlocking parts 1212 of the two unlocking arms 121 are respectively disposed at one side of the buckling recesses 1122 of the two buckling bumps 112. The unlocking parts 1212 of the two unlocking arms 121 are respectively farther than the wire end buckling parts 1211 of the two unlocking arms 121 away from the wire end accommodating part 111. Wherein the second direction Y is orthogonal to the first direction X.

Figure 3:
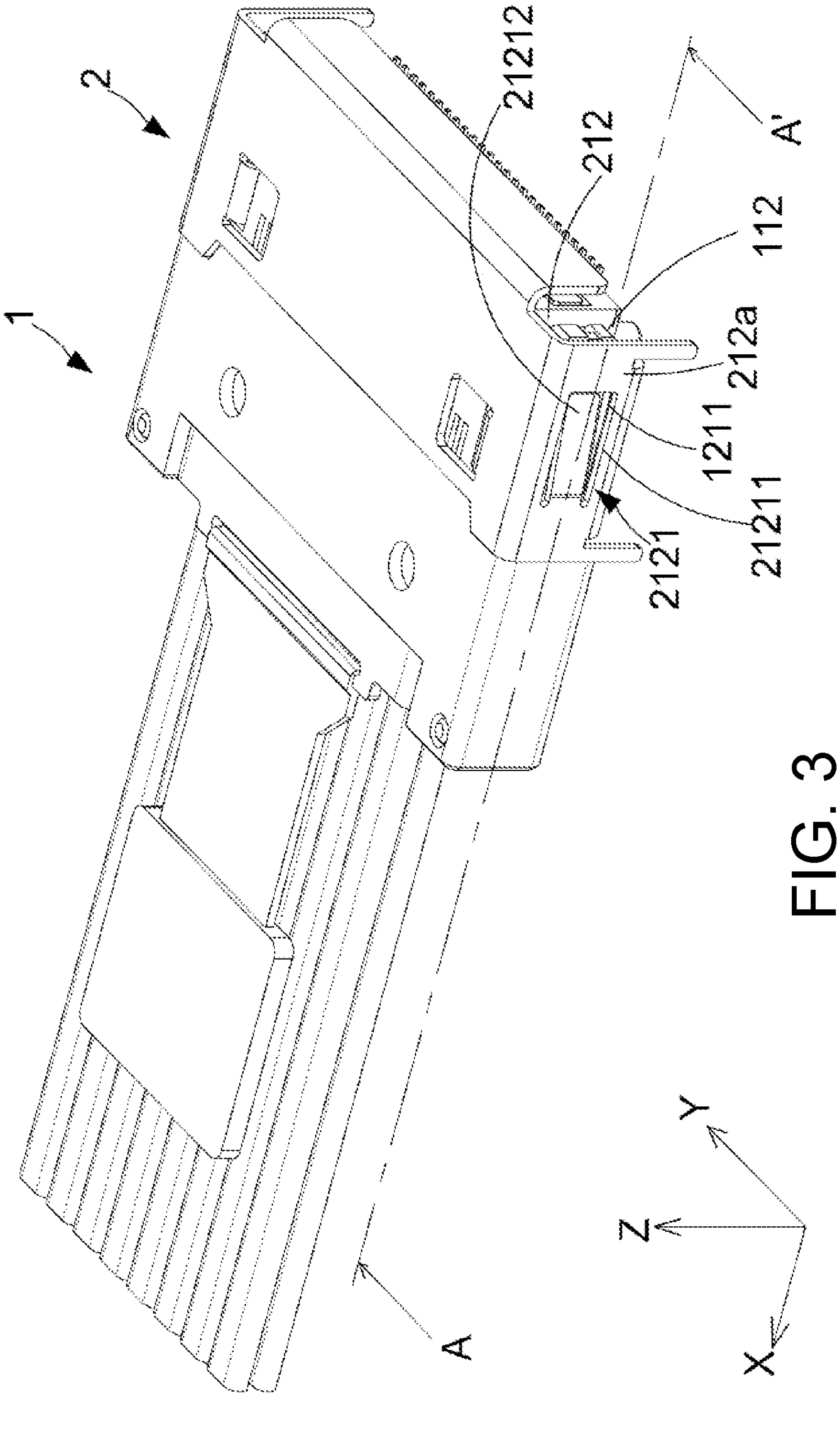
FIG. 3 is a perspective view of a connector assembly of an embodiment of the present disclosure.
Figure 4:
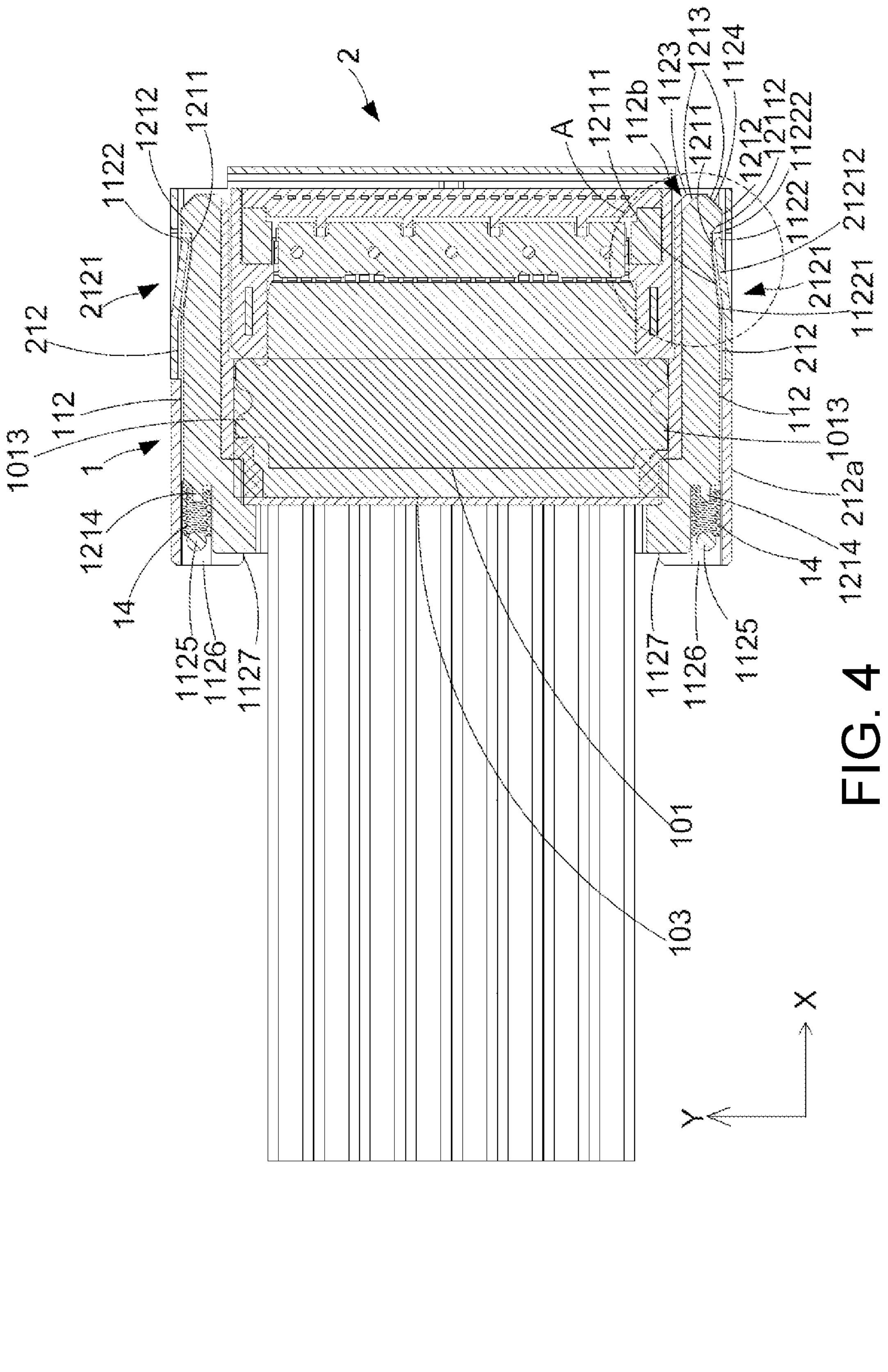
FIG. 4 is a cross-sectional view along line A-A' of FIG. 3.

FIG. 3 is a perspective view of a connector assembly of an embodiment of the present disclosure. FIG. 4 is a cross-sectional view along line A-A' of FIG. 3. As shown in the figures, when the wire end connector 1 and the board end connector 2 are connected to form a connector assembly, the buckling recesses 1122 of the two buckling bumps 112 of the wire end connector 1, and the wire end buckling parts 1211 of the two unlocking arms 121 are respectively connected with the board end connector 2, which indicates that the wire end connector 1 is locked to the board end connector 2. When the unlocking member 12 is pulled, the two unlocking parts 1212 of the unlocking member 12 respectively disconnect the connection between the buckling recesses 1122 of the two buckling bumps 112 and the board end connector 2 and the connection between the wire end buckling parts 1211 of the two unlocking arms 121 and the board end connector 2, which releases the connection between wire end connector 1 and the board end connector 2 so that the wire end connector 1 would be detached from the board end connector 2.

Figure 5:
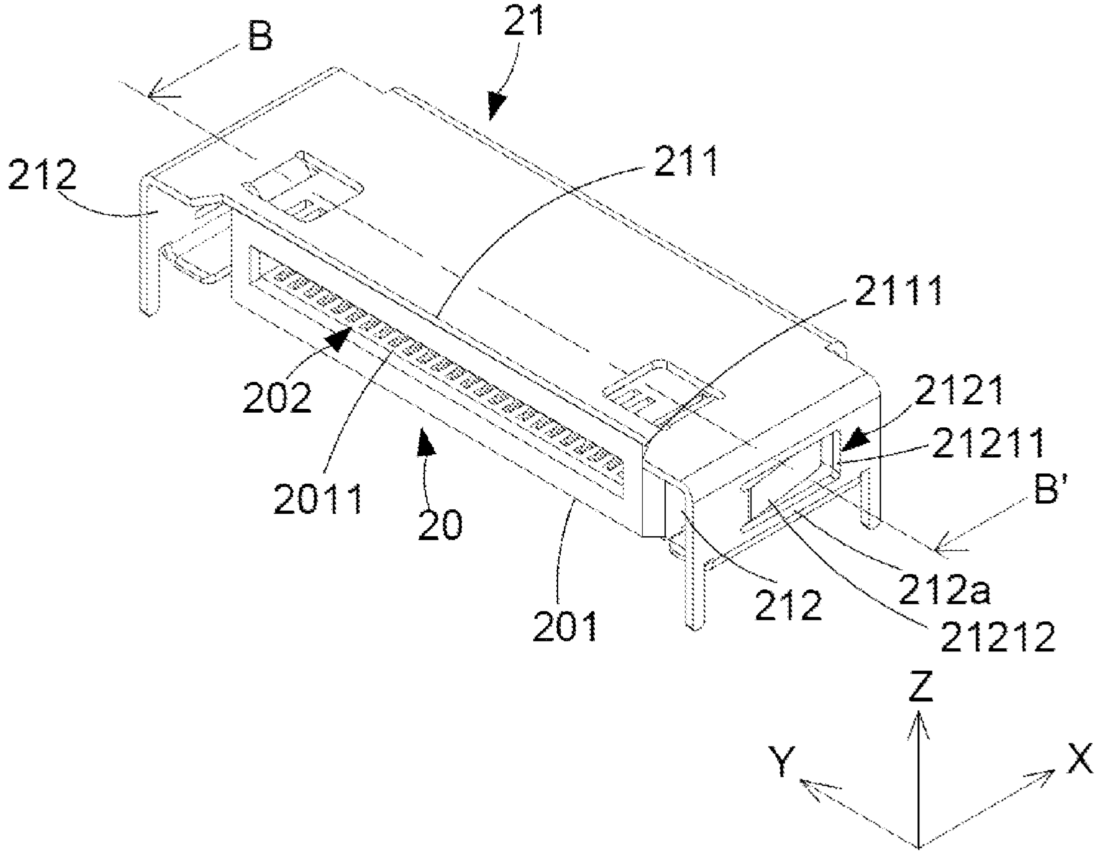
FIG. 5 is a perspective view of a board end connector of an embodiment of the present disclosure.
Figure 6:
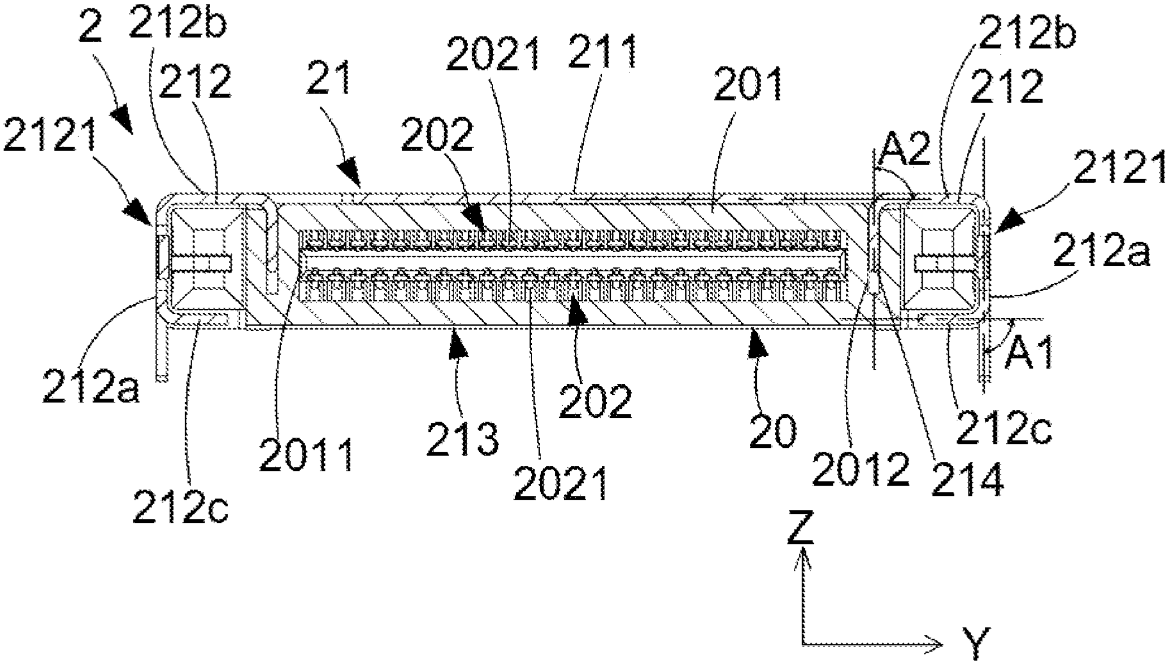
FIG. 6 is a cross-sectional view along line B-B' of FIG. 5.

FIG. 5 is a perspective view of a board end connector of an embodiment of the present disclosure. FIG. 6 is a cross-sectional view along line B-B' of FIG. 5. As shown in the figures, in this embodiment, the board end connector 2 comprises a board end connector body 20 and a board end housing 21. The board end housing 21 comprises a board end accommodating part 211 and two buckling slots 212. One side of the board end accommodating part 211 in the first direction X comprises a board end opening 2111. The two buckling slots 212 are oppositely disposed on two sides of the board end accommodating part 211. The board end connector body 20 is disposed in the board end accommodating part 211. A sidewall 212*a* of the two buckling slots 212 in the second direction Y and away from the board end accommodating part 211 respectively comprise a board end buckling part 2121.

Referring to FIG. 3 and FIG. 4 again, when the wire end connector 1 is connected with the board end connector 2, the two buckling bumps 112 of the wire end connector 1 would respectively enter the two buckling slots 212. The two board end buckling parts 2121 of the board end connector 2 are respectively disposed in the buckling recesses 1122 of the two buckling bumps 112. The two board end buckling parts 2121 would restrict the movement of the wire end buckling parts 1211 of the two unlocking arms 121 of the two buckling bumps 112 in the first direction X and the second direction Y, allowing the wire end connector 1 to be locked with the board end connector 2. Besides, as the unlocking parts 1212 of the two unlocking arms 121 of the two buckling bumps 112 respectively abut against the two board end buckling parts 2121 of the board end connector 2, the wire end connector 1 would be disconnected with the board end connector 2.

The configuration of the wire end connector 1 and the board end connector 2 would be described in detail below.

As shown in FIG. 1, FIG. 2, and FIG. 4, the two buckling bumps 112 of the wire end housing 11 of the wire end connector 1 respectively comprise an accommodating through groove 1123 extending along the first direction X. The accommodating through groove 1123 penetrates the first end 112*a* and the second end 112*b* of the buckling bump 112. The accommodating through groove 1123 communicates with the corresponding buckling recess 1122. The two unlocking arms 121 of the unlocking member 12 are movably disposed in the corresponding accommodating through grooves 1123. The two unlocking arms 121 of the unlocking member 12 could move in the corresponding accommodating through grooves 1123.

Figure 7:
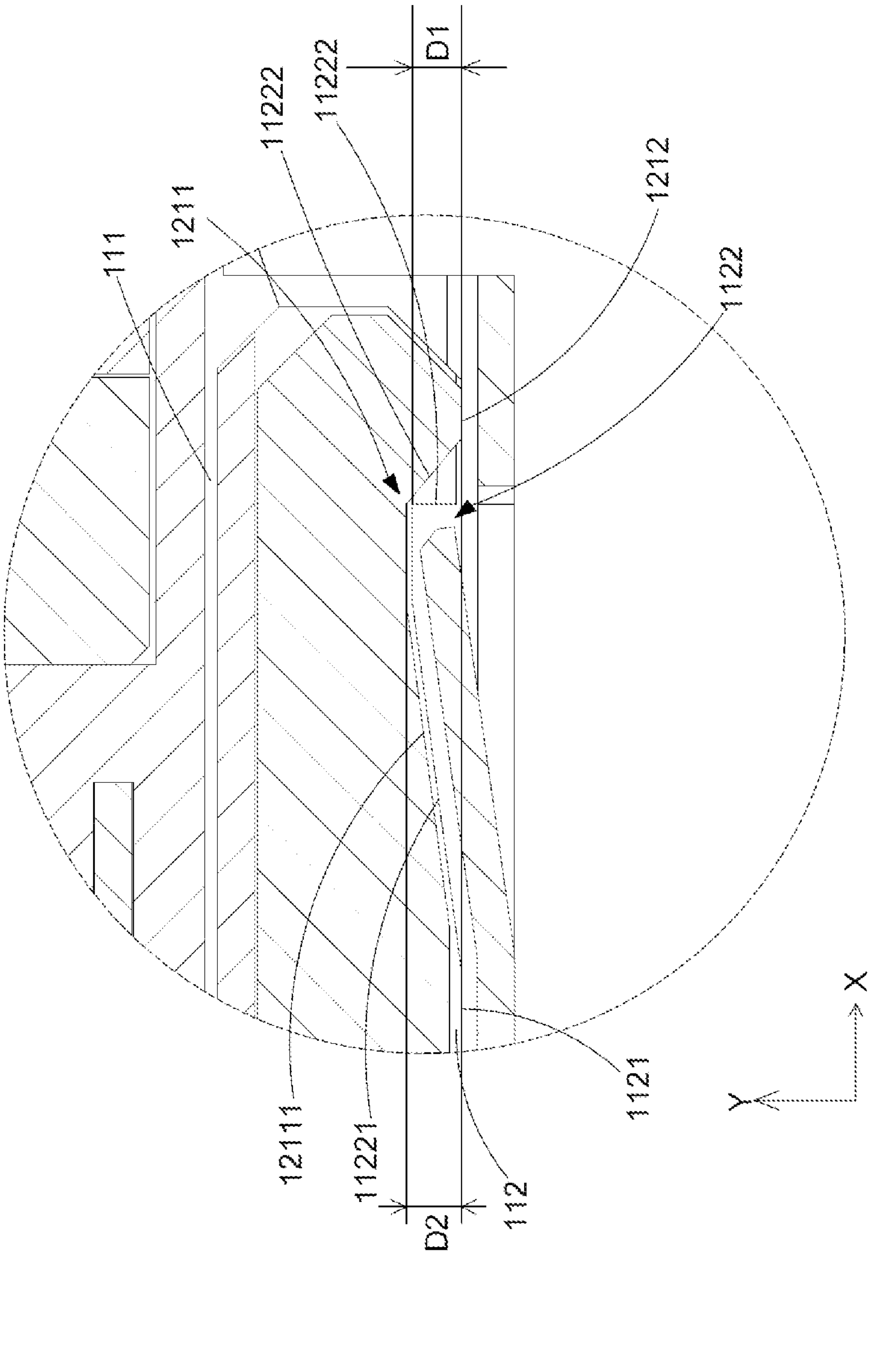
FIG. 7 is an enlarged view of area A of FIG. 4.

FIG. 7 is an enlarged view of area A of FIG. 4. As shown in the figure, the buckling recess 1122 comprises a first limiting sidewall 11221 and a second limiting sidewall 11222 in the first direction X. The second limiting sidewall 11222 is farther than the first limiting sidewall 11221 from the wire end accommodating part 111. In this embodiment, the first limiting sidewall 11221 is inclined to the first direction X, the second limiting sidewall 11222 is orthogonal to the first direction X. A distance D1 between one end of the first limiting sidewall 11221 close to the wire end accommodating part 111 and an outer surface 1121 of the buckling bump 112 in the second direction Y and away from the wire end accommodating part 111 is greater than the distance between one end of the first limiting sidewall 11221 away from the wire end accommodating part 111 and the outer surface 1121 of the buckling bump 112 in the second direction Y and away from the wire end accommodating part 111. In this embodiment, one end of the first limiting sidewall 11221 away from the wire end accommodating part 111 is coplanar with the outer surface 1121 of the buckling bump 112 in the second direction Y and away from the wire end accommodating part 111. Thus, the distance between one end of the first limiting sidewall 11221 away from the wire end accommodating part 111 and the outer surface 1121 of the buckling bump 112 in the second direction Y and away from the wire end accommodating part 111 is zero, which is not shown in FIG. 7. The distance between one end of the first limiting sidewall 11221 away from the wire end accommodating part 111 and the outer surface 1121 of the buckling bump 112 in the second direction Y and away from the wire end accommodating part 111 could be greater than zero but still needs to be smaller than the distance D1 between one end of the first limiting sidewall 11221 close to the wire end accommodating part 111 and an outer surface 1121 of the buckling bump 112 in the second direction Y and away from the wire end accommodating part 111.

The shape of the wire end buckling part 1211 of the two unlocking arms 121 matches the shape of the buckling recess 1122. The wire end buckling part 1211 is a notch and comprises a first limiting side edge 12111 and a second limiting side edge 12112 in the first direction X. The first limiting side edge 12111 corresponds to the first limiting sidewall 11221, and the second limiting side edge 12112 corresponds to the second limiting sidewall 11222.

As shown in FIG. 3 to FIG. 5, the board end buckling parts 2121 of the two buckling slots 212 of the board end housing 21 respectively comprise a retaining opening 21211 and a buckling elastic piece 21212. The retaining opening 21211 penetrates the sidewall 212*a* of the buckling slot 212 in the second direction Y and away from the board end accommodating part 211. One end of the buckling elastic piece 21212 is connected with a side edge of the retaining opening 21211 in the first direction X and close to the board end accommodating part 211. The buckling elastic piece 21212 extends in a direction away from the board end accommodating part 211. The buckling elastic piece 21212 is inclined to the sidewall 212*a* of the buckling slot 212 in the second direction Y and away from a sidewall 212*a*, and is bent into the buckling slot 212.

When the wire end connector 1 is connected with the board end connector 2, the two buckling bumps 112 of the wire end connector 1 would respectively enter the two buckling slots 212, the buckling elastic pieces 21212 of the board end connector 2 would be respectively disposed in the buckling recesses 1122 of the two buckling bumps 112 and disposed at one side of the first limiting sidewall 11221, and the buckling elastic pieces 21212 of the two board end buckling parts 2121 would respectively correspond to the first limiting side edge 12111 of the two wire end buckling parts 1211. In this way, the buckling elastic pieces 21212 of the two board end buckling parts 2121 could respectively restrict the two buckling bumps 112 and the two unlocking arms 121 to only move in the second direction Y, and to restrict the wire end connector 1 to only move in the second direction Y relative to the board end connector 2.

An end surface of the other ends of the buckling elastic piece 21212 of the two board end buckling parts 2121 respectively correspond to the second limiting sidewall 11222 of the two buckling recesses 1122 and the second limiting side edge 12112 of the two wire end buckling parts 1211. At this time, the buckling elastic piece 21212 is inclined to the sidewall 212*a* of the buckling slot 212 in the second direction Y and away from a sidewall 212*a*, and is bent into the buckling slot 212, which indicates that the buckling elastic piece 21212 is disposed in the buckling recess 1122. In this way, the end surfaces of the other ends of the buckling elastic pieces 21212 of the two board end buckling parts 2121 could respectively restrict the two buckling bumps 112 and the two unlocking arms 121 to only move in the first direction X, which also restricts the terminal connector 1 to only move in the first direction X relative to the board end connector 2, preventing the wire end connector 1 from detaching from the board end connector 2.

As shown in FIG. 2 and FIG. 4, the unlocking parts 1212 of the two unlocking arms 121 of the unlocking member 12 are disposed at one side of the wire end buckling part 1211 away from the wire end accommodating part 111. The unlocking part 1212 is connected with the second limiting side edge 12112. To detach the wire end connector 1 from the board end connector 2, simply pull the unlocking member 12. The unlocking member 12 would move along the first direction X and in a direction away from the board end connector 2. The unlocking parts 1212 of the two unlocking arms 121 would respectively pass through the buckling recesses 1122 of the two locking bumps 112. The unlocking parts 1212 of the two unlocking arms 121 respectively move and protrude from the first limiting sidewalls 11221 of the two buckling recesses 1122. The two unlocking parts 1212 respectively push the buckling elastic pieces 21212 of the two board end buckling parts 2121 to bend toward the outside of the buckling slot 212, allowing the buckling elastic piece 21212 and the buckling slot 212 to be in the second direction Y and away from the sidewall 212*a* of the board end accommodating part 211. Meanwhile, the unlocking member 12 drives the wire end housing 11 accommodating the wire end connector body 10 to move away from the board end connector 2. The two buckling bumps 112 are detached from the two buckling slots 212 of the board end housing 21 so that the wire end connector 1 and the board end connector 2 can be completely separated. In this embodiment, the unlocking parts 1212 of the two unlocking arms 121 are respectively a plane orthogonal to the second direction Y.

In this embodiment, as shown in FIG. 7, the second limiting side edges 12112 of the two wire end buckling parts 1211 of the two unlocking arms 121 is inclined to the second direction Y. A distance D2 between one side of the second limiting side edge 12112 close to the first limiting side edge 12111 and a side edge of the unlocking arm 121 in the second direction Y is greater than the distance between one side of the second limiting side edge 12112 connected with the unlocking part 1212 and a side edge of the unlocking arm 121 in the second direction Y. In this embodiment, one side of the second limiting side edge 12112 connected with the unlocking part 1212 is coplanar with a side edge of the unlocking arm 121 in the second direction Y. In this way, the distance between one side of the second limiting side edge 12112 connected with the unlocking part 1212 and a side edge of the unlocking arm 121 in the second direction Y is zero, which is not shown in FIG. 7. The distance between one side of the second limiting side edge 12112 connected with the unlocking part 1212 and a side edge of the unlocking arm 121 in the second direction Y can be greater than zero, but still needs to be smaller than the distance D2 between one side of the second limiting side edge 12112 close to the first limiting side edge 12111 and a side edge of the unlocking arm 121 in the second direction Y. Thus, the second limiting side edge 12112 is inclined to the second limiting sidewall 11222 of the buckling recess 1122, the inclining direction of the second limiting side edge 12112 is opposite to the inclining direction of the first limiting sidewall 11221, and the second limiting side edge 12112 is disposed in the accommodating through groove 1123.

Figure 8:
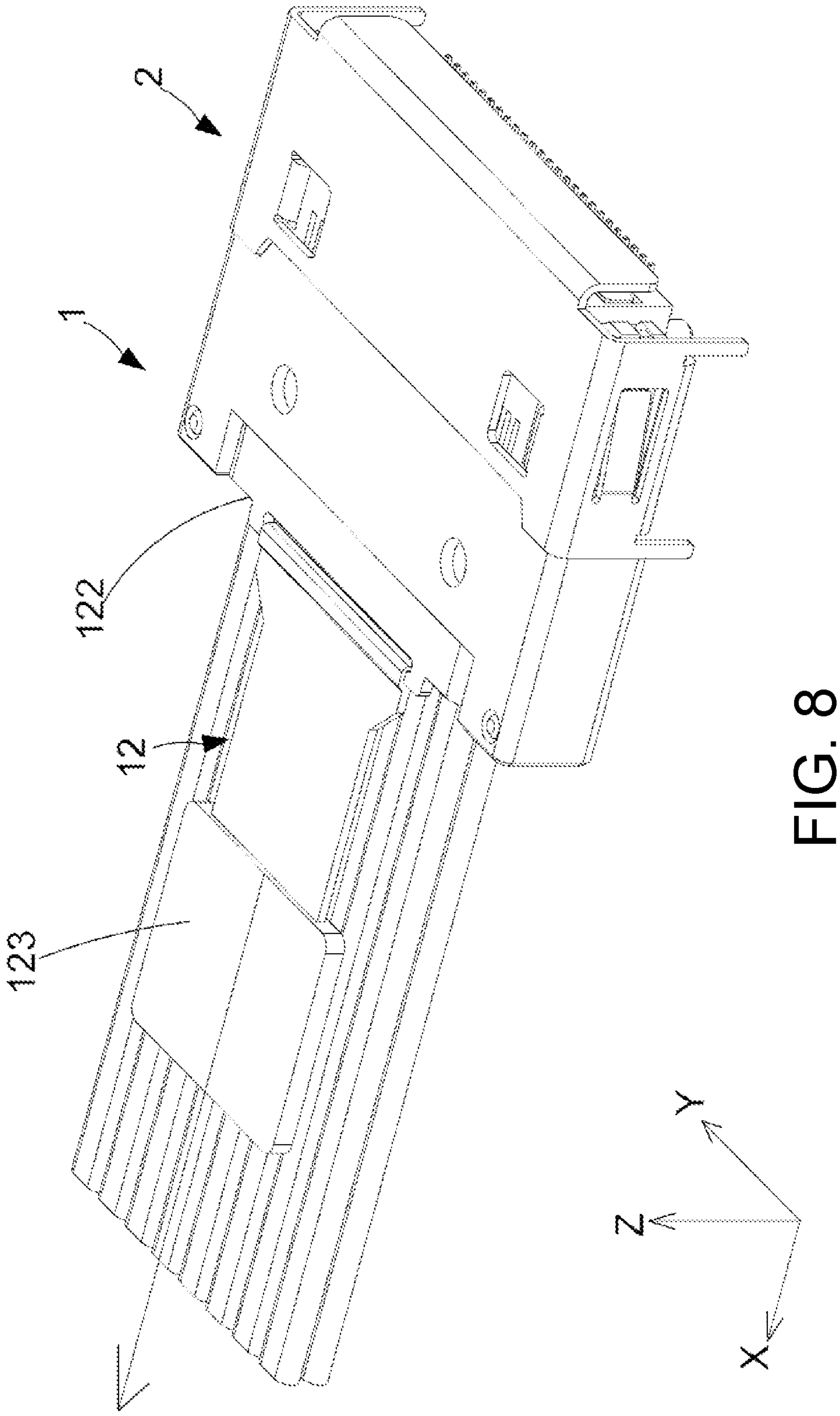
FIG. 8 is an action perspective view of a connector assembly of an embodiment of the present disclosure.
Figure 9:
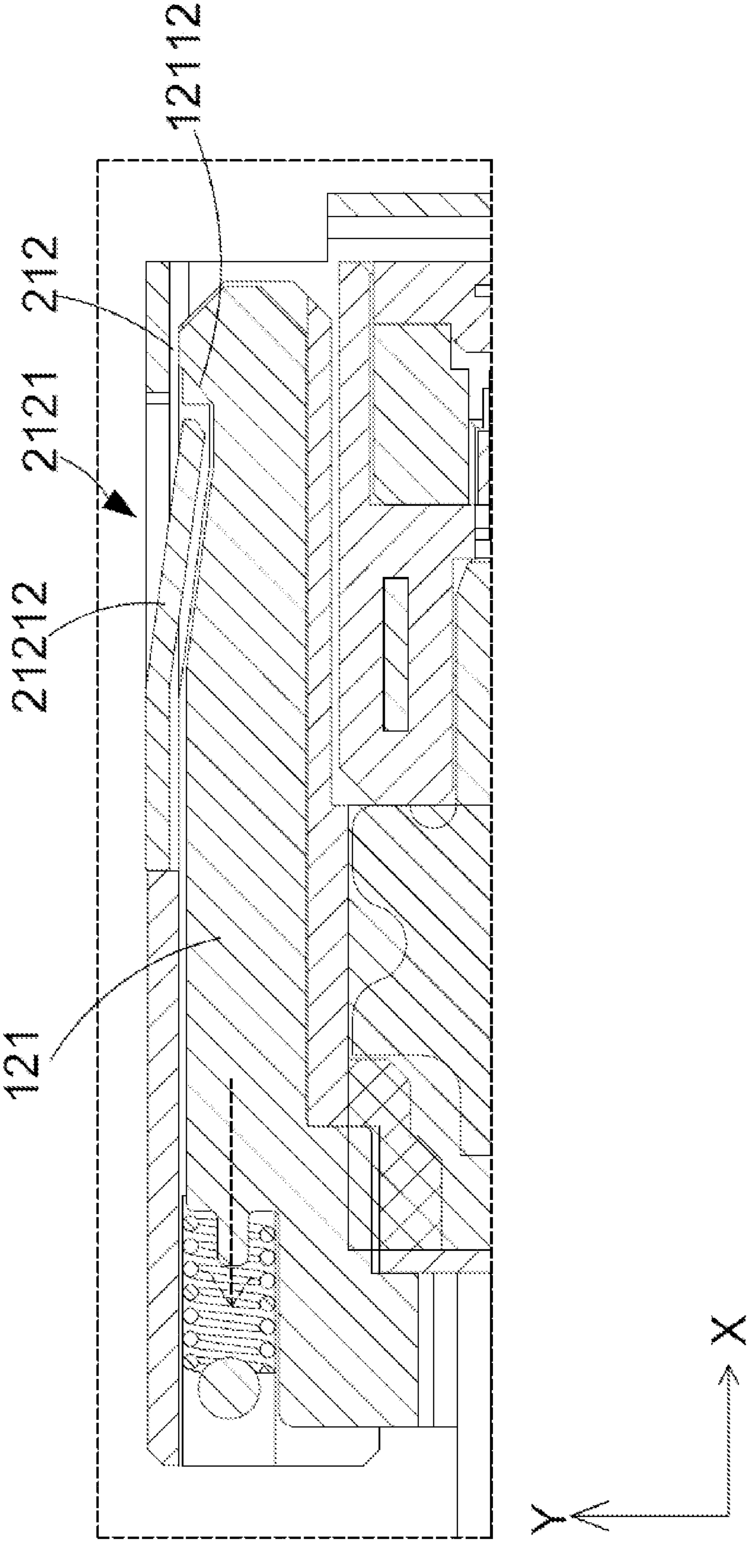
FIG. 9 is a partial cross-sectional view of a connector assembly of an embodiment of the present disclosure.
Figure 10:
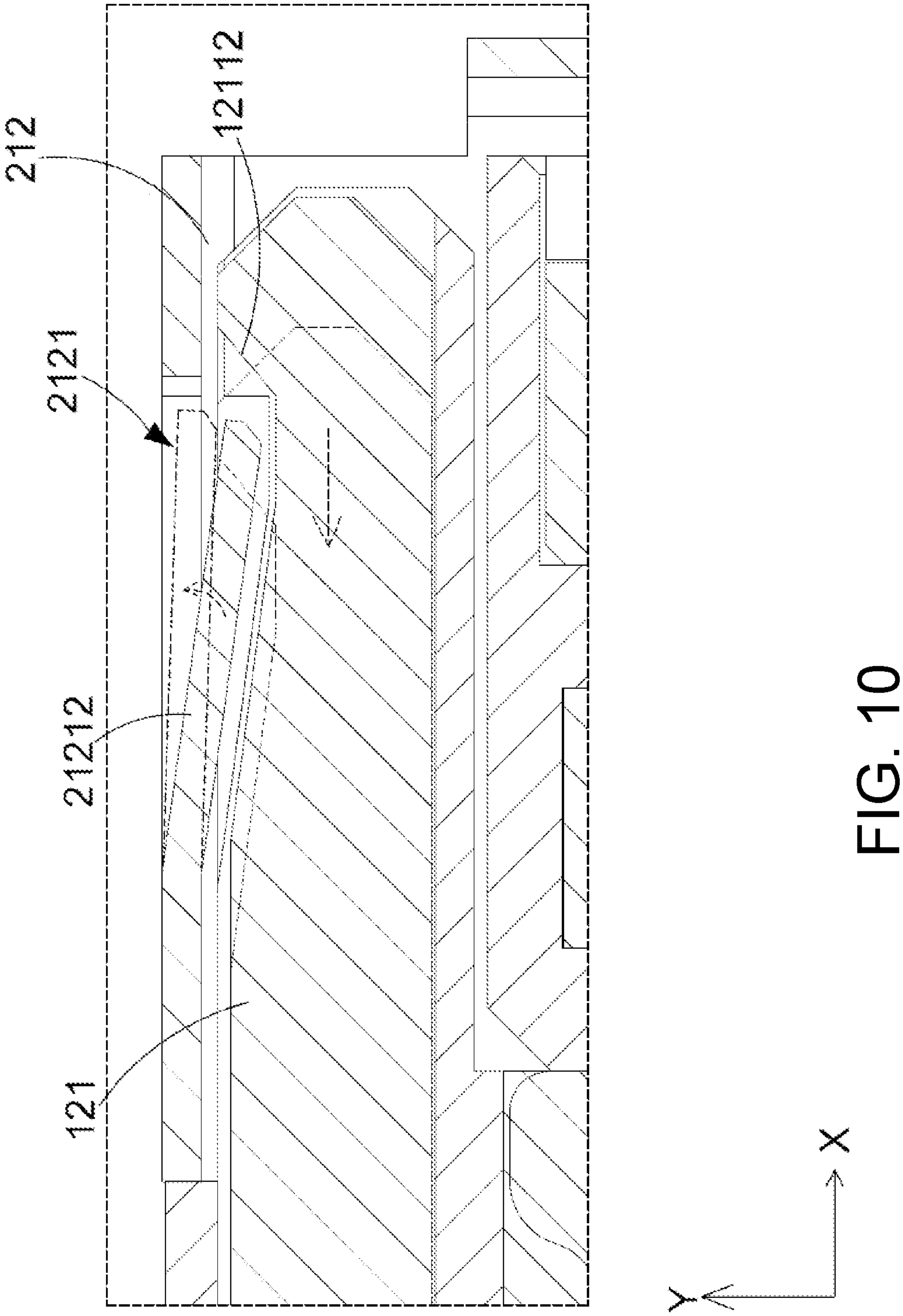
FIG. 10 is a schematic diagram of the action of the unlocking part and the buckling elastic piece of an embodiment of the present disclosure.

FIG. 8 and FIG. 9 are action perspective view and partial cross-sectional view of a connector assembly of an embodiment of the present disclosure. FIG. 10 is a schematic diagram of the action of the unlocking part and the buckling elastic piece of an embodiment of the present disclosure. As shown in the figures, when the unlocking member 12 moves away from the board end connector 2, the second limiting side edges 12112 of the two unlocking arms 121 would be respectively in contact with an end surface of the buckling elastic pieces 21212 of the two board end buckling parts 2121. When the unlocking member 12 continues to move away from the board end connector 2, the end surfaces of the buckling elastic pieces 21212 of the two board end buckling parts 2121 would be respectively bent to the outside of the buckling slot 212 along the second limiting side edge 12112 of the two unlocking arms 121. Finally, the unlocking parts 1212 of the two unlocking arms 121 would be in contact with the buckling elastic pieces 21212 of the two board end buckling parts 2121. At this time, the buckling elastic pieces 21212 of the two board end buckling parts 2121 are bent to the outside of the buckling slot 212 to the greatest extent, so the second limiting side edge 12112 of the two unlocking arms 121 could function as a guiding component.

In this embodiment, four surfaces of the second end 112*b* of the two buckling bumps 112 away from the wire end accommodating part 111 in the first direction X and the second direction Y respectively comprise a guiding inclined surface 1124, through which the size of the second end 112*b* of the two buckling bumps 112 can be reduced, allowing the two buckling bumps 112 to be respectively inserted into the two buckling slots 212 without obstruction. The inclining direction of the guiding inclined surface 1124 of the second end 112*b* of the two buckling bumps 112 in the second direction Y and away from the board end accommodating part 211 is the same as the inclining direction of the buckling elastic pieces 21212 of the two board end buckling parts 2121.

When the second ends 112*b* of the two buckling bumps 112 pass through the two board end buckling parts 2121, the guiding inclined surface 1124 of the second end 112*b* of the two buckling bumps 112 in the second direction Y and away from the board end accommodating part 211 would be moving relative to the buckling elastic pieces 21212 of the two board end buckling parts 2121 and would push the buckling elastic pieces 21212 of the two board end buckling parts 2121 to bend toward the outside of the buckling slot 212, allowing the two buckling bumps 112 to pass through the buckling elastic pieces 21212 of the two plate end buckling parts 2121 without obstruction and to be are disposed in the two buckling slots 212. In this embodiment, two opposite sides of the two unlocking arms 121 in the second direction Y away from the buckling end 121*b* of the wire end accommodating part 111 comprises a chamfer 1213 preventing the buckling ends 121*b* of the two unlocking arms 121 from protruding from the two buckling bumps 112.

In one embodiment, as shown in FIG. 2 and FIG. 4, the wire end connector 1 further comprises two elastic members 14, which are respectively disposed in the two accommodating through grooves 1123. One ends of the two elastic members 14 respectively abut against the connecting ends 121*a* of the two unlocking arms 121. The other ends of the two elastic members 14 respectively abut against the first ends 112*a* of the two buckling bumps 112. When the two unlocking arms 121 are pushed to approach the wire end accommodating part 111 along the first direction X, the two unlocking arms 121 would respectively compress the two elastic pieces 14. When stop pushing, the two compressed elastic members 14 would be released, and the elastic force of the two elastic members 14 would respectively push the two unlocking arms 121 to move away from the wire end accommodating part 111 along the first direction X. In this way, the two unlocking arms 121 can be automatically restored to the initial position, allowing the unlocking member 12 to be automatically restored to the initial position.

In this embodiment, as shown in FIG. 2 and FIG. 4, the connecting ends 121*a* of the two unlocking arms 121 respectively comprise a positioning column 1214. The positioning column 1214 extends away from the buckling end 121*b* along the first direction X. One end of the positioning column 1214 away from the buckling end 121*b* penetrates into the corresponding elastic member 14. The positions where the two elastic members 14 abut against the connecting ends 121*a* of the two unlocking arms 121 can be positioned through the positioning column 1214. In this embodiment, the two buckling bumps 112 further comprise a limiting column 1125 respectively. The limiting column 1125 is disposed in the corresponding accommodating through groove 1123 and is disposed at the first end 112*a* of the corresponding buckling bump 112. In this embodiment, the two limiting columns 1125 extend along the third direction Z. Two ends of the two limiting columns 1125 are respectively connected with two opposite sidewalls of the two accommodating through grooves 1123 in the third direction Z. The other ends of the two elastic members 14 respectively abut against the two limiting columns 1125. The positions where the two elastic members 14 abut against the first ends 112*a* of the two buckling bumps 112 can be positioned through the limiting column 1125. Wherein the third direction Z is orthogonal to the first direction X and the second direction Y. In this embodiment, the elastic member 14 is a spring.

In this embodiment, the two limiting columns 1125 are movably disposed on the two buckling bumps 112 respectively, which indicates that the two limiting columns 1125 can be assembled on the two buckling bumps 112, and can also be disassembled from the two buckling bumps 112.

In this embodiment, two opposite sidewalls of the two accommodating through grooves 1123 in the third direction Z respectively comprise a through hole 11231. Two ends of the two limiting columns 1125 are respectively disposed in the two through holes 11231 of the two accommodating through grooves 1123. The first ends 112*a* of the two buckling bumps 112 respectively comprise an elastic member insertion hole 1126. The two elastic members 14 can be respectively inserted into the two accommodating through grooves 1123 through the elastic member insertion holes 1126 of the two buckling bumps 112 for assembling. In practice, two elastic members 14 are respectively disposed in the two accommodating through grooves 1123 through the elastic member insertion holes 1126, then the two limiting columns 1125 are respectively disposed in the two accommodating through grooves 1123 through the two through holes 11231. The two limiting columns 1125 are disposed in the elastic member insertion holes 1126 to prevent the elastic member 14 from protruding from the elastic member insertion hole 1126.

As shown in FIG. 1 and FIG. 2, in this embodiment, the unlocking member 12 further comprises a buckling connecting piece 122, and two ends of which are respectively connected with the connecting ends 121*a* of the two unlocking arms 121. When the unlocking member 12 is disposed at one side of the wire end housing 11 away from the wire end opening 1111, the buckling connecting piece 122 would be disposed at one side of the wire end housing 11 away from the wire end opening 1111. In this embodiment, one side of the wire end housing 11 away from the wire end opening 1111 further comprises a retaining notch 113. The first ends 112*a* of the two buckling bumps 112 are disposed on two sides of the retaining notch 113. When the unlocking member 12 is disposed at one side of the wire end housing 11 away from the wire end opening 1111, the buckling connecting piece 122 would be disposed in the retaining notch 113 to prevent the buckling connecting piece 122 from protruding from one side of the wire end housing 11 away from the wire end opening 1111. As shown in FIG. 4, the first ends 112*a* of the two buckling bumps 112 comprises a connecting opening 1127 on a surface close to the retaining notch 113 in the second direction Y. The connecting opening 1127 is in communication with the accommodating through groove 1123. The joints between the two unlocking arms 121 and the buckling connecting piece 122 are respectively in the connecting openings 1127 of the two buckling bumps 112.

As shown in FIG. 1, FIG. 2, and FIG. 8, the unlocking member 12 of this embodiment further comprises an activation piece 123, one end of which is connected with the buckling connecting piece 122. The two unlocking arms 121 can be pulled by pulling the activation piece 123, which is convenient for operation. In this embodiment, the activation piece 123 is a puller strap.

Figure 11:
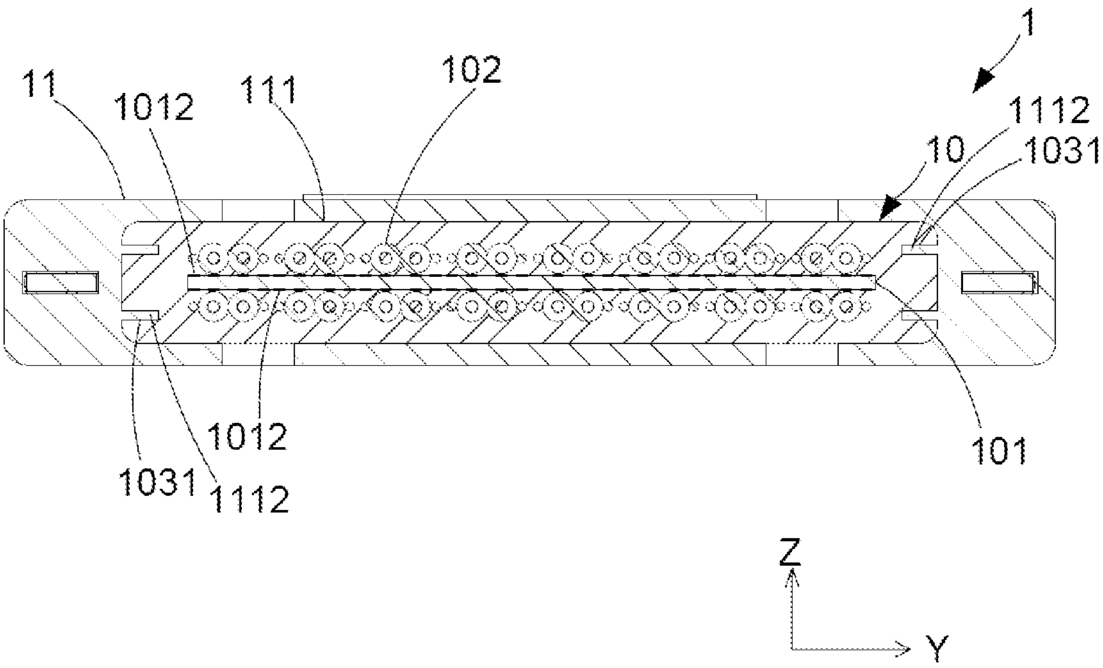
FIG. 11 is a cross-sectional view along line C-C' of FIG. 1.

FIG. 11 is a cross-sectional view along line C-C' of FIG. 1. Referring to FIG. 11 with FIG. 1 and FIG. 2, the wire end connector body 10 of this embodiment comprises a circuit board 101, a plurality of cables 102, and a wire end insulating body 103. The circuit board 101 comprises a plurality of contacting pads 1011 and a plurality of cable connecting pads 1012. The plurality of contacting pads 1011 are arranged in a row at intervals along the second direction Y. The plurality of cable connecting pads 1012 are arranged in a row at intervals along the second direction Y. The plurality of contacting pads 1011 arranged in a row and the plurality of cable connecting pads 1012 arranged in a row are arranged on two opposite sides of the circuit board 101 along the first direction X. The plurality of cables 102 are connected with the plurality of cable connecting pads 1012. The wire end insulating body 103 covers the joints between the plurality of cables 102 and the plurality of cable connecting pads 1012 and a part of the circuit board 101. One side of the circuit board 101 comprising a plurality of contacting pads 1011 is exposed from the terminal insulating body 103.

When the wire end connector body 10 of this embodiment is disposed in the wire end accommodating part 111 of the wire end housing 11, the wire end insulating body 103 would be disposed in the wire end accommodating part 111, One side of the circuit board 101 comprising a plurality of contacting pads 1011 would protrude from the wire end opening 1111 of the wire end housing 11, and the plurality of cables 102 would protrude from one side of the wire end housing 11 away from the wire end opening 1111. In this embodiment, two opposite sides of the wire end insulating body 103 in the second direction Y further comprises a positioning recess 1031. Two opposite sidewalls of the wire end accommodating part 111 of the wire end housing 11 in the second direction Y further comprises a positioning bump 1112. The positioning bump 1112 is disposed in the positioning recess 1031 to secure the wire end insulating body 103 in the wire end accommodating part 111 of the wire end housing 11, allowing the wire end housing 11 to be firmly connected with the terminal insulating body 103. As shown in FIG. 4, in this embodiment, two opposite sides of the circuit board 101 in the second direction Y further comprises an interfering bump 1013. The interfering bump 1013 interferes with the terminal insulating body 103, which increases the connection stability between the circuit board 101 and the terminal insulating body 103. In this embodiment, the wire end insulating body 103 and the wire end housing 11 are produced by injection molding.

As shown in FIG. 5 and FIG. 6, the board end connector body 20 of this embodiment comprises a board end insulating body 201 and two terminal modules 202. The board end insulating body 201 comprises a slot 2011. The two terminal modules 202 are disposed in the slot 2011 along the third direction Z in a stacked manner. A bottom surface of the board end accommodating part 211 of the board end housing 21 in the third direction Z comprises a notch 213. The two terminal modules 202 respectively comprise a plurality of terminals 2021. One ends of the plurality of terminals 2021 is disposed in the slot 2011. The other ends of the plurality of terminals 2021 are exposed from the notch 213 to connect with an external circuit board.

In this embodiment, the two buckling slots 212 of the board end housing 21 further comprise a top surface 212*b* in the third direction Z. One side of the top surface 212*b* is connected with one side of the sidewall 212*a*. The sidewall 212*a* is orthogonal to the top surface 212*b*. The two buckling slots 212 of the board end housing 21 respectively comprise an extending support piece 212*c* extending in the second direction Y. One side of the extending support piece 212*c* is connected with the other side of the sidewall 212*a* and corresponds to the top surface 212*b*. That is, the extending support piece 212*c* and the top surface 212*b* are disposed in the third direction Z at intervals, and the other side of the extending support piece 212*c* is suspended. When the two buckling bumps 112 of the wire end connector 1 are respectively disposed in the two buckling slots 212, the extending support piece 212*c* would support the corresponding buckling bump 112. A first angle A1 is formed between the extending support piece 212*c* and the sidewall 212*a*. In this embodiment, the first angle A1 is 90 degrees, that is, the extending support piece 212*c* is orthogonal to the sidewall 212*a*. The first angle A1 can be smaller than 90 degrees to reduce the distance between the extending support piece 212*c* and the top surface 212*b*. When the two buckling bumps 112 of the wire end connector 1 are respectively disposed in the two buckling slots 212, the extending support piece 212*c* and the top surface 212*b* would restrict the buckling bump 112 to only move in the third direction Z.

The top surface of the board end accommodating part 211 of the board end housing 21 further comprises two positioning pieces 214 extending into the board end accommodating part 211 along the third direction Z. The top surface of the board end insulating body 201 of the board end connector body 20 further comprises two positioning grooves 2012 in the third direction Z. The two positioning grooves 2012 extend along the third direction Z. When the board end connector body 20 is disposed in the board end accommodating part 211, the two positioning pieces 214 would be respectively disposed in the two positioning grooves 2012 to position the board end connector body 20 in the board end accommodating part 211. In this embodiment, a second angle A2 is respectively formed between the two positioning pieces 214 and the top surface of the board end accommodating part 211 of the board end housing 21. In this embodiment, the second angle A2 is 90 degrees, that is, the two positioning pieces 214 are respectively orthogonal to the top surface of the board end accommodating part 211 of the board end housing 21. In other embodiments, the second angle A2 could be smaller than 90 degrees, so that the two positioning pieces 214 could respectively abut against the sidewalls of the two positioning slots 2012 close to the buckling slot 212. Thus, the board end connector body 20 can be effectively secured in the board end accommodating part 211.

In summary, embodiments of the present disclosure provide a wire end connector and a connector assembly. Since the two buckling bumps of the wire end connector are disposed on two sides of the wire end connector body and the two unlocking arms of the unlocking member are disposed in the two buckling bumps, the two unlocking arms could be moving in a horizontal direction. Thus, the thickness of the wire end connector in the vertical direction would not be increased, allowing the thickness of the wire end connector to be thinned. Besides, The unlocking member is easy to manufacture due to its simple structural configuration. The wire end connector is provided with an elastic member, through which the unlocking member can be self-restored.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A wire end connector, comprising:

a wire end housing comprising a wire end accommodating part and a retaining notch, the wire end accommodating part accommodating a wire end connector body of the wire end connector; and an unlocking member disposed at one side of the wire end housing that comprising the retaining notch, the unlocking member comprising two opposite unlocking arms, an activation piece and a buckling connecting piece, the two unlocking arms being movably disposed in the wire end housing, one end of the buckling connecting piece being connected to the two unlocking arms and disposed in the retaining notch, another end of the buckling connecting piece being connected to the activation piece.

2. The wire end connector according to claim 1, wherein the wire end housing further comprises two buckling bumps oppositely disposed at two sides of the wire end accommodating part, an end surface of the wire end accommodating part in a first direction comprising a wire end opening, an outer surface of the two buckling bumps in a second direction orthogonal to the first direction and away from the wire end accommodating part respectively comprising a buckling recess.

3. The wire end connector according to claim 2, wherein the two unlocking arms being movably disposed in the two buckling bumps respectively, an outer side edge of the two unlocking arms in the second direction and away from the wire end accommodating part respectively comprising a wire end buckling part and an unlocking part, the wire end buckling part corresponding to the buckling recess, the unlocking part being farther than the wire end buckling part from the wire end accommodating part.

4. The wire end connector according to claim 3, wherein the two buckling bumps respectively comprise an accommodating through groove extending along the first direction; the accommodating through groove communicates with the buckling recess; the two unlocking arms are movably disposed in the corresponding accommodating through grooves, respectively.

5. The wire end connector according to claim 4, wherein the two buckling bumps respectively comprise a first end and a second end; the two unlocking arms respectively comprise a connecting end and a buckling end; the connecting end is disposed in the first end; the buckling end is disposed in the second end; the wire end connector comprises an elastic member disposed in the accommodating through groove; one ends of the elastic members respectively abut against the connecting end of the unlocking arm; the other ends of the elastic members respectively abut against the first end of the buckling bump.

6. The wire end connector according to claim 5, wherein the connecting ends of the unlocking arms respectively comprise a positioning column; the positioning column extends along the first direction away from the buckling end; one end of the positioning column penetrates into the elastic member.

7. The wire end connector according to claim 5, wherein the two buckling bumps respectively comprise a limiting column; the limiting column is disposed in the corresponding accommodating through groove and is disposed at the first end of the corresponding buckling bump; the other end of the elastic member abuts against the corresponding limiting column.

8. The wire end connector according to claim 7, wherein the first ends of the two buckling bumps respectively comprise an elastic member insertion hole in which the limiting column is disposed.

9. The wire end connector according to claim 5, wherein two ends of the buckling connecting piece are respectively connected with the connecting ends of the two unlocking arms.

10. The wire end connector according to claim 9, wherein one side of the wire end housing away from the wire end opening is provided with the retaining notch; the first ends of the two buckling bumps are disposed on two sides of the retaining notch.

11. The wire end connector according to claim 9, wherein the activation piece is a puller strap.

12. The wire end connector according to claim 3, wherein the buckling recess comprises a first limiting sidewall and a second limiting sidewall in the first direction; the second limiting sidewall is farther than the first limiting sidewall from the wire end accommodating part; the first limiting sidewall is inclined to the first direction; the second limiting sidewall is orthogonal to the first direction.

13. The wire end connector according to claim 12, wherein the distance between one end of the first limiting sidewall close to the wire end accommodating part and an outer surface of one of the buckling bumps in the second direction and away from the wire end accommodating part is greater than the distance between one end of the first limiting sidewall away from the wire end accommodating part and the outer surface of one of the buckling bumps in the second direction and away from the wire end accommodating part.

14. The wire end connector according to claim 12, wherein the wire end buckling part comprises a first limiting side edge and a second limiting side edge in the first direction; the first limiting side edge corresponds to the first limiting sidewall; the second limiting side edge corresponds to the second limiting sidewall.

15. The wire end connector according to claim 14, wherein the second limiting side edge is inclined to the second direction; the inclining direction of the second limiting side edge is opposite to the inclining direction of the first limiting sidewall.

16. The wire end connector according to claim 12, wherein the unlocking part protrudes from the buckling recess when the unlocking part passes through the buckling recess.

17. The wire end connector according to claim 15, wherein the unlocking part is a flat surface orthogonal to the second direction.

18. The wire end connector according to claim 3, wherein one ends of the two buckling bumps away from the wire end accommodating part comprise a guiding inclined surface.

19. The wire end connector according to claim 18, wherein one ends of the two unlocking arms away from the wire end accommodating part comprise a chamfer.

20. A connector assembly, comprising:

a wire end connector according to claim 1; and a board end connector comprising a board end connector body and a board end housing accommodating the board end connector body, the board end housing comprising two buckling slots, an outer surface of the two buckling slots away from the board end connector body respectively comprising a board end buckling part;

wherein when the unlocking member moves in a direction away from the board end connector, the two opposite unlocking arms would pass through the wire end housing and pushes the board end buckling part.

* * * * *